No. 694,483. Patented Mar. 4, 1902.
W. M. KELCH.
FARE REGISTER AND RECORDER.
(Application filed Apr. 1, 1898. Renewed Feb. 17, 1899.)

(No Model.) 4 Sheets—Sheet 1.

Witnesses:

Inventor:

No. 694,483. Patented Mar. 4, 1902.
W. M. KELCH.
FARE REGISTER AND RECORDER.
(Application filed Apr. 1, 1898. Renewed Feb. 17, 1899.)

(No Model.) 4 Sheets—Sheet 2.

Witnesses:
Inventor: W. M. Kelch,
By R. J. McCarty,
Attorney

No. 694,483. Patented Mar. 4, 1902.
W. M. KELCH.
FARE REGISTER AND RECORDER.
(Application filed Apr. 1, 1898. Renewed Feb. 17, 1899.)
(No Model.) 4 Sheets—Sheet 3.
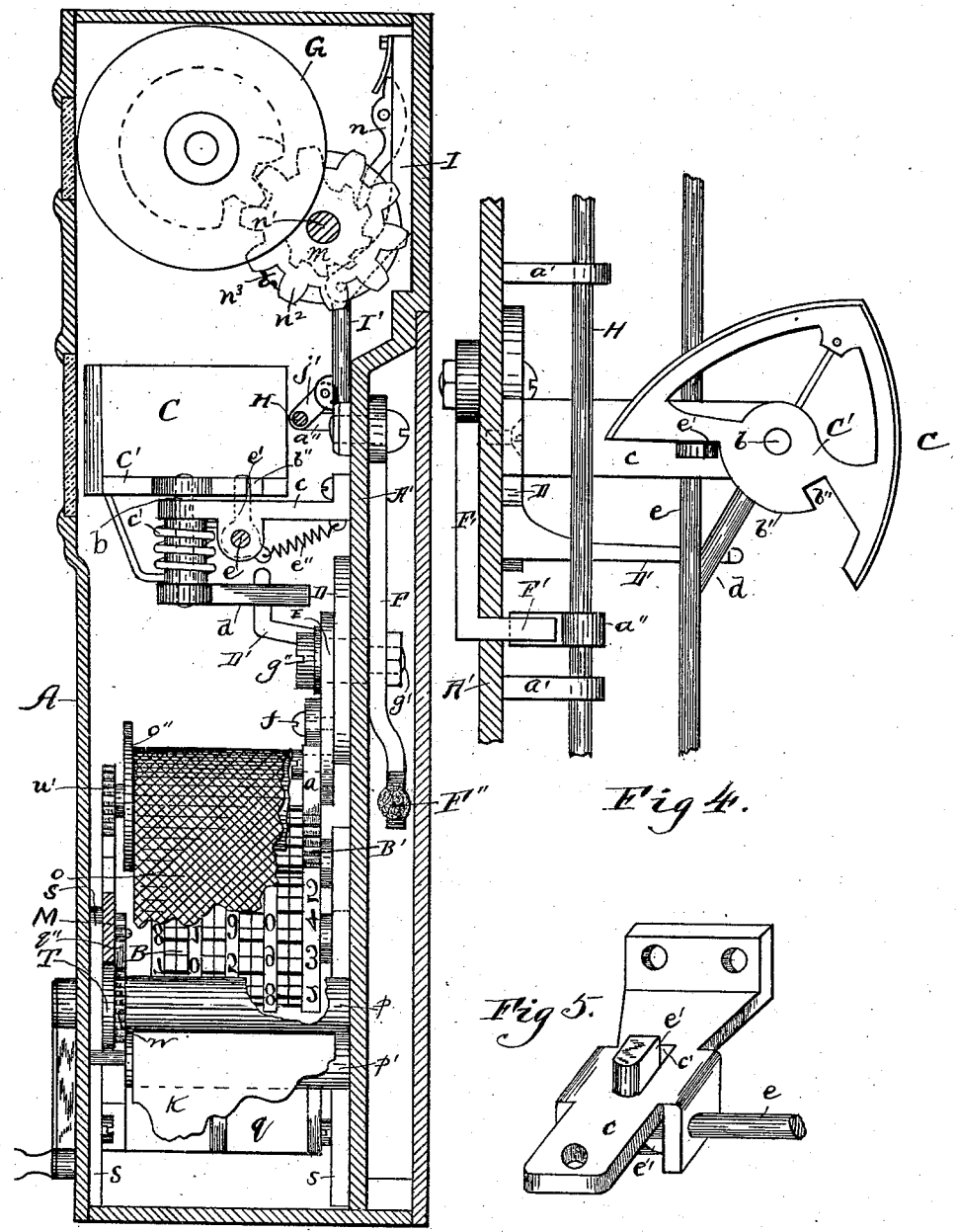
Fig 3.
Fig 4.
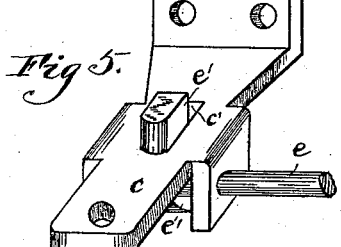
Fig 5.
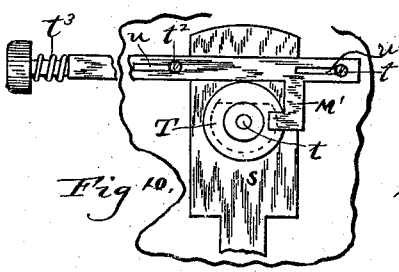
Fig 10.
Witnesses:
Inventor:
W. M. Kelch,
Attorney.

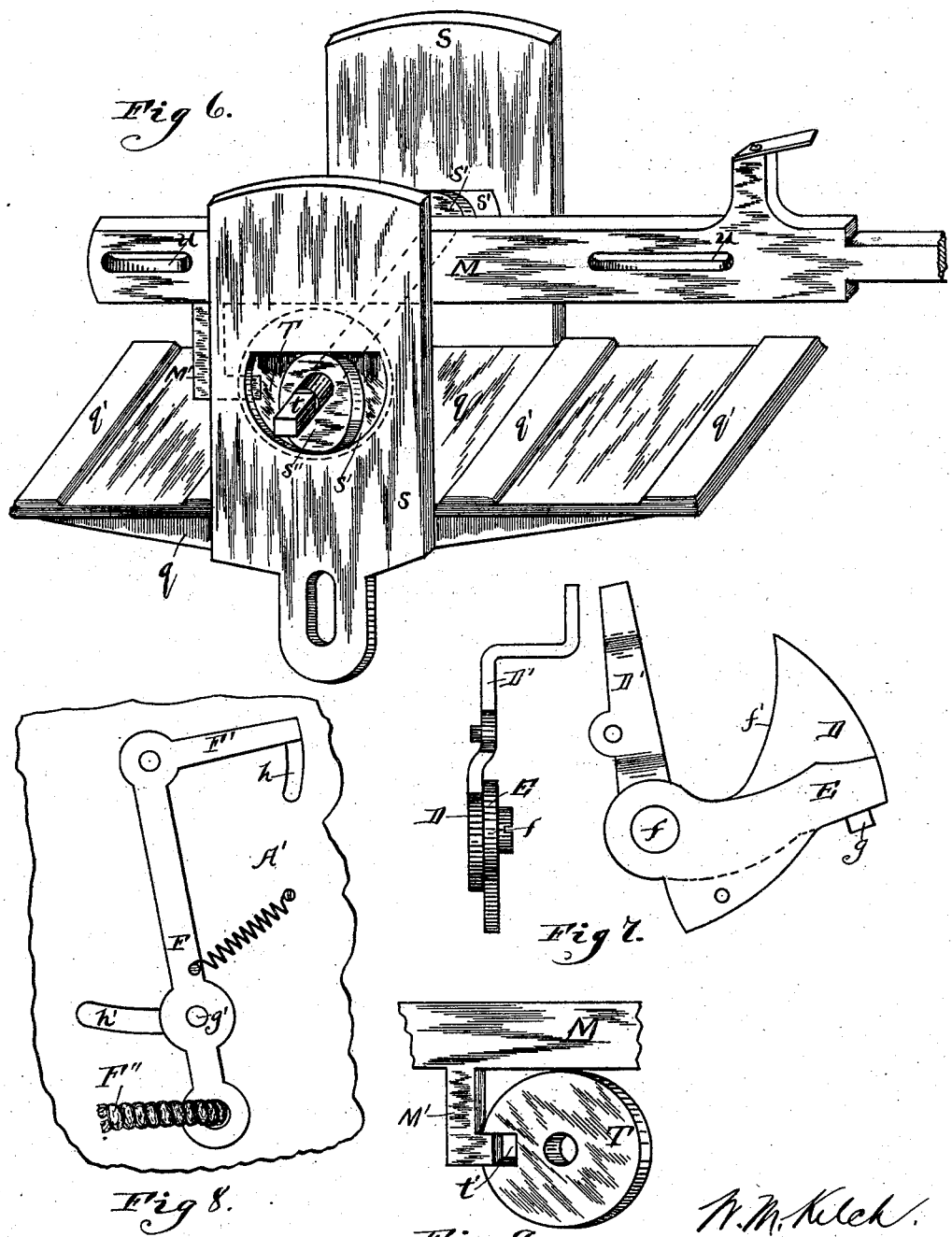

UNITED STATES PATENT OFFICE.

WALLACE M. KELCH, OF DAYTON, OHIO, ASSIGNOR TO WILFRED I. OHMER, OF DAYTON, OHIO.

FARE REGISTER AND RECORDER.

SPECIFICATION forming part of Letters Patent No. 694,483, dated March 4, 1902.

Application filed April 1, 1898. Renewed February 17, 1899. Serial No. 705,861. (No model.)

*To all whom it may concern:*

Be it known that I, WALLACE M. KELCH, a citizen of the United States, residing at Dayton, in the county of Montgomery and State of Ohio, have invented certain new and useful Improvements in Fare Registers and Recorders; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to improvements in fare registers, recorders, and indicators for street-cars, and consists of certain mechanisms hereinafter described and claimed.

Figure 1:
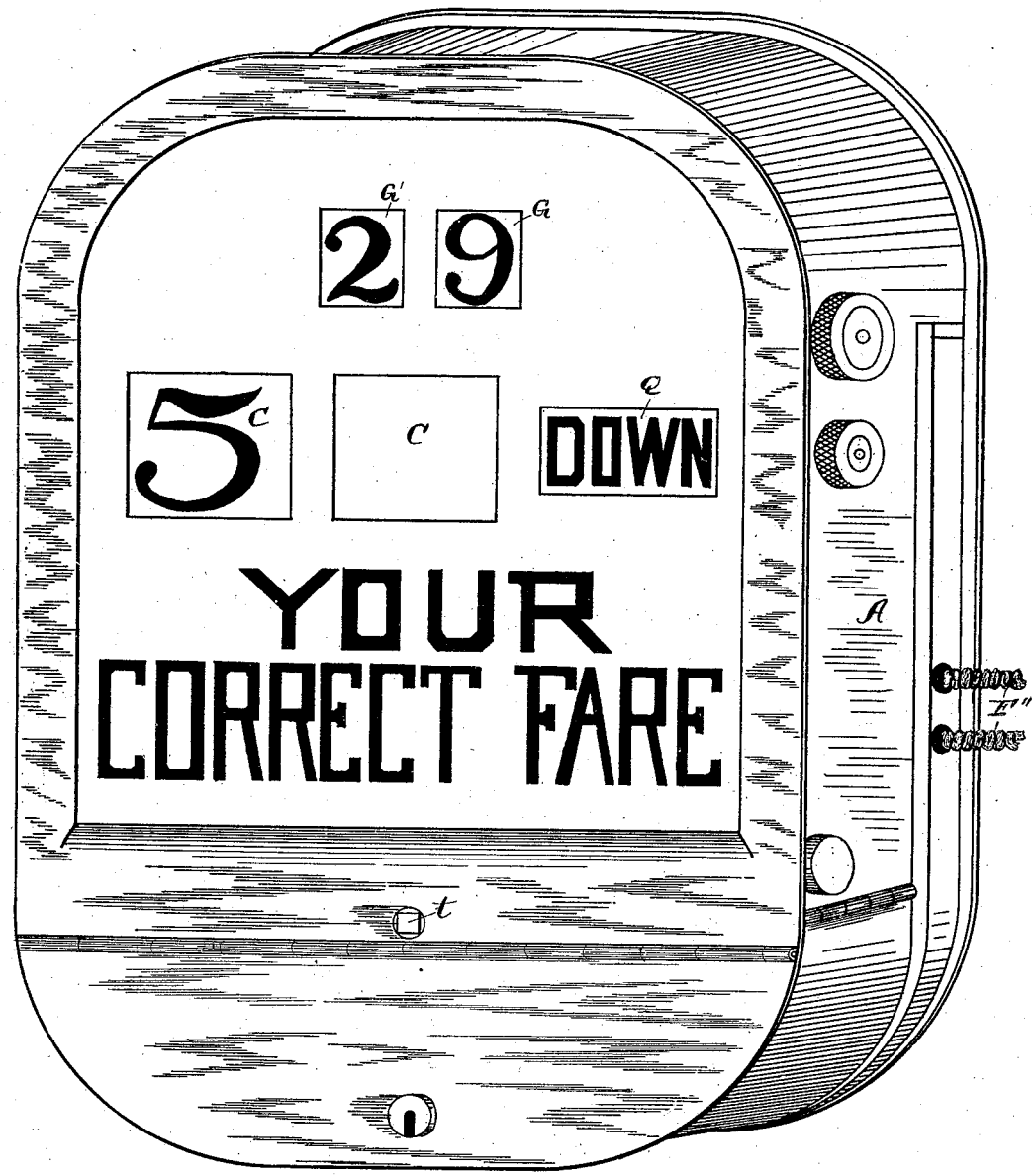
Figure 2:
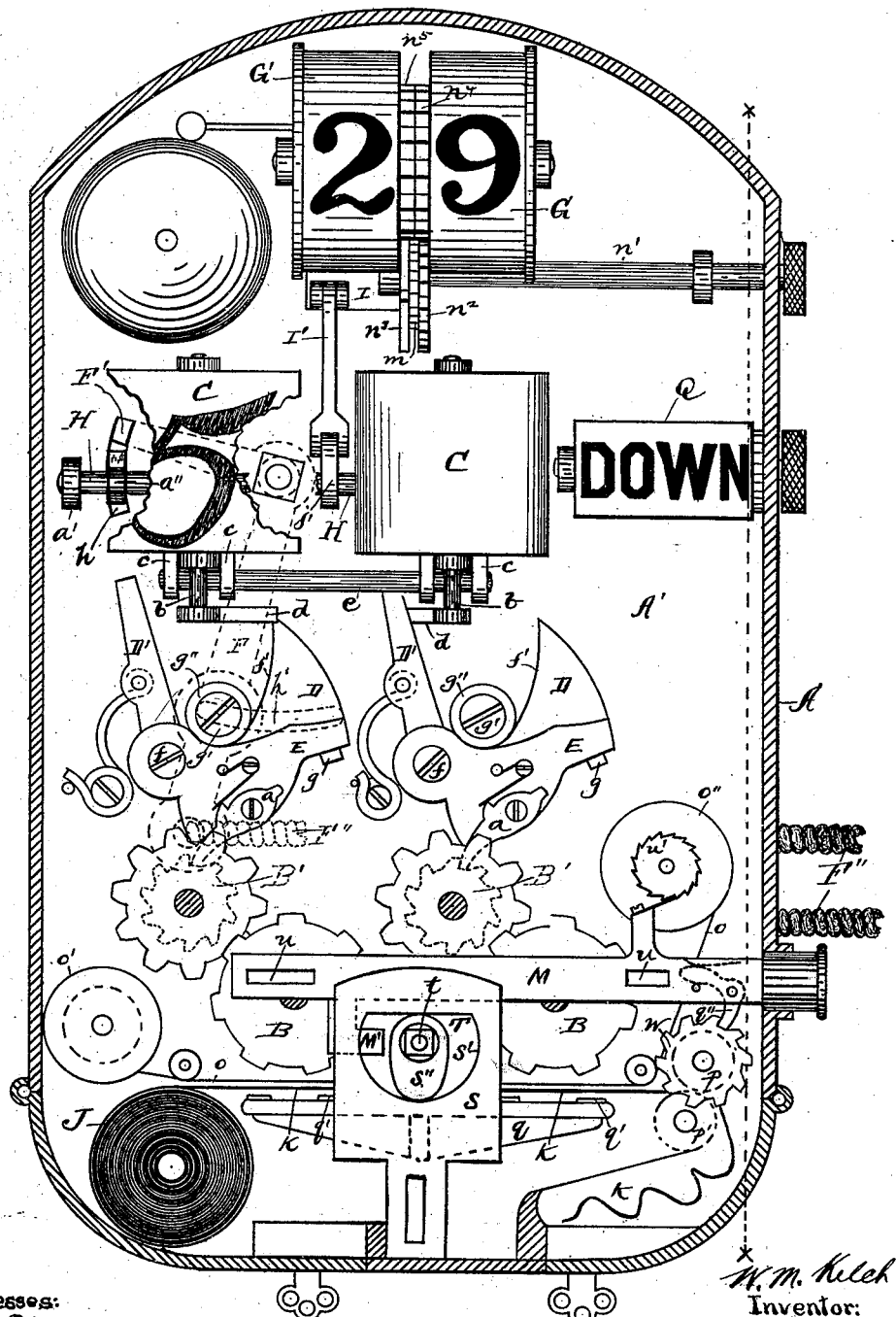

Referring to the accompanying drawings, which fully illustrate the said invention, Figure 1 is a perspective view of my improved fare register and recorder. Fig. 2 is a front elevation with the front of the case removed. Fig. 3 is an end sectional elevation on the line $x\ x$ of Fig. 2. Fig. 4 is a top view of one of the fare-indicators and adjuncts. Fig. 5 is a perspective view of one of the bearings or brackets of the fare-indicator mechanism. Fig. 6 is a perspective view of the printing mechanism; Fig. 7, detached front and end elevations of the differential plates that actuate the fare-register wheels and indicators. Fig. 8 is a rear elevation of a portion of the inner back of the case and one of the main operating-levers that actuates the differential plates. Fig. 9 is a detailed view of the locking-bar and disk of the printing mechanism. Fig. 10 is an elevation of a portion of the inside of the front of the case, showing a portion of the printing mechanism.

Throughout the specification similar reference characters indicate corresponding parts.

The metallic case A has its lower portion hinged so as to enable access to be had to the printing mechanism. The front of the case consists of a glass panel above the hinged portion, and in the rear of said glass there is a white background, which gives the face of the register a neat and distinct appearance. In Fig. 2 a somewhat-different style of case is shown; but that shown in Fig. 1 is the preferred style. The register-wheels B, upon which the fares are recorded, are arranged in separate groups or series, each of which is confined to a separate and distinct class of fares—for example, full fares, half-fares, transfers, &c. The units-wheel of each series has fixed to the primary actuating-wheels a ratchet-wheel B', that is actuated by a pawl $a$ in a manner hereinafter described. The units-wheel transfers to the "tens-wheel" or the next adjacent wheel, and so on, in a way that is commonly understood. The indicators, through which the specific fares of each series of register-wheels are exhibited, are separate and distinct from each other. These indicators C are subject to rotary movements in horizontal planes, and each consists of the construction shown in Fig. 4, in which $b$ designates a vertical shaft, upon which the frame is mounted, the plate C' thereof having a fixed attachment. This plate C', to which the sides are attached, has a cam-surface $b'$, that leads to a locking-slot $b''$, the point of said cam-surface being the greatest from the center of said plate as it approaches said slot. As shown in Fig. 4, the fare-indicators have visible sides only, one of which is blank and the other of which contains the fare. Fig. 2 shows the opposite sides of two of said indicators, one containing no-fare indication and the other containing an indication of a five-cent fare. The indicator-shaft $b$ has its lower end journaled in a bracket $c$, that is secured to the rear of the case, and is inclosed by a coil-spring $c'$, an end of which is secured to the plate C'. An arm $d$ is also fixed to said shaft.

$e$ designates an oscillating shaft journaled in the brackets $c$ below the indicators and which is provided with a rigid finger $e'$ at each indicator. These fingers $e'$ project up through openings $c'$ in the brackets $c$ and occupy positions for the cam-surfaces $b'$ of the plates C' to move in contact with as each indicator is rotated. Each of the fingers $e'$ has a spring $e''$, that normally draws in the direction of the center of the plates C', so that when an indicator is turned to exhibit a fare and the slot $b''$ arrives at the finger $e'$ the said finger enters the slot under the control of the spring $e''$, and the particular indicator thereby is maintained in a position to expose a fare. I will next describe the mechanism through the instrumentality of which these fare-indicators and the classified fare-registering wheels B are operated. This mechanism is fully shown in Figs. 2, 7, and 8 and comprises two differential plates D and E, which are placed side by side and pivotally connected at $f$. Each set is actuated by an operating-lever F. There is one pair of such plates and a lever for each series of fare-register wheels and each fare-indicator. The inner plate D has a cam-surface $f'$ and an upwardly-extending arm D', that lies in a proper position to come in contact with the arm $d$ on the indicator-shaft $b$. The function of said plate D is therefore to actuate an indicator and having to move a greater distance than its companion plate a greater cam-surface is provided thereon. The plate E supports a ratchet-pawl $a$, pivoted to it and engaging with the teeth of ratchet-wheel B'. The movement of said plate is limited by a stop $g$ on plate D and said movement being necessarily less than the movement of the latter plate. The operating-levers F are inclosed in the space between the inner and outer backs A and A' of the case. In the inner back of the case there are two segmental slots $h$ and $h'$ at right angles. A pin $g'$ projects from said lever through slot $h'$ above the plates D and E and carries an antifriction-roller $g''$, which rides upon the upper edges of said plates and moves them to simultaneously register and indicate a fare. The levers F are individually operated by ropes F'', that pass out through the case.

In addition to the results obtained by the foregoing means indications of the number of passengers carried on each trip or any number of trips irrespective of the classifications of fares are also made as follows: G and G' designate indicator-wheels bearing numerals denoting the number of passengers. These wheels are actuated alike upon the operation of the mechanism of each class of fares through an oscillating shaft H, which is journaled in brackets $a'$. Adjacent to each of said fare-indicators there is a rigid finger $a''$ on said shaft H, that projects in the path of the upper arm F' of the operating-lever. It will be seen in Figs. 2 and 8 this arm is angular and its extreme end projects through the slot $h$ in the rear side of the case. As the said lever is operated the extreme end coming in contact with one of the fingers $a''$ the shaft H is moved thereby. This movement of said shaft is transmitted to a reciprocable slide I, that moves up and down, (see Figs. 2 and 3,) movement being conveyed thereto by a pitman I', which has a loose connection with said slide and which is also connected loosely to the said shaft H by a link $j'$. The plate or slide I carries a pivotal ratchet-pawl $n$, that engages a ratchet-wheel $m$ on shaft $n'$. On this shaft $n'$ there are two wheels $n''$ and $n^3$, which are fixed thereon. Wheel $n''$ is a spur-gear meshing with a spur-gear $n^4$, fixed to indicator G.

$n^3$ is a transfer-wheel, with one tooth operating upon a spur-gear $n^5$, fixed to indicator-wheel G'.

The next feature of my invention comprises mechanism for printing or taking an impression of the register-wheels. This mechanism is illustrated in Figs. 2, 6, and 8 and is as follows: $o$ is an ink-ribbon passing from roll $o'$ to roll $o''$ below the faces of said wheels; J, a paper-roll, the web $k$ of which lies below the ink-ribbon and passes between feed-rollers $p$ and $p'$. The end of the paper after passing between the final rollers $p$ and $p'$ enters the lower part of the case, as shown in Fig. 2, from whence it is removed after detaching it. The lower portion of the casing is hinged to permit access thereto.

$q$ is a vertically-movable platen beneath the web of paper and adapted in its upward movement to carry the ribbon and paper against the faces of the wheels. The portions of said platen that impact with the wheels are provided with cushions or pads $q'$. On each side of said platen there is a slide S, having a semicircular opening S', in which cams S'' move to raise and lower the platen. The said cams are mounted on a shaft $t$, having bearing in the case, and the front end thereof is square to receive a crank by which it is turned. The said shaft may be locked against rotation by a disk T, which is fixed thereto and which has a locking-slot $t'$, into which and out of which a locking-bolt M' may be moved. The said bolt M' projects from a horizontal bar M, that is slidably mounted on pins $t''$ on the lower front of the case, the said pins entering oblong slots $u$ in the bar. (See Fig. 10.) The outer end of the said bar projects through an opening in a side of the case and is pushed in to remove the bolt M' from the slot $t'$. A spring $t^3$, Fig. 10, normally keeps the parts interlocked. In this inward movement of the slide-bar M a ratchet-pawl $q''$, carried thereon and engaging with a ratchet-wheel $w$ on the shaft of one of the feed-rollers, turns said rollers to unwind the paper from roll J. In the backward movement of the bar under the action of its spring. The ratchets-$w'$-wind the ink-ribbon.

Q is a direction-block that may be turned by the fingers to indicate the direction of the car.

It will be understood that the capacity of the register to accommodate more than two classes of fares is increased by multiplying the groups of mechanisms described in the foregoing.

As the invention is shown and described it has only a capacity for registering and indicating two classes of fares.

Briefly describing the operation of the machine, as previously stated the mechanisms are grouped, each group having its own operating-rope or analogous device. When it is desired to register and indicate a fare and to indicate a passenger, the rope of that particular class of fares is drawn upon. An operating-lever F is thereby actuated, the differential plates D and E and the oscillating shaft H are concurrently moved, and a series of register-wheels, a fare-indicator, and the passenger-indicating wheels operated.

Having described my invention, I claim—

1. In a fare-register, the combination of groups of fare-registering wheels, each group having its own classification of fares, a rotatable fare-indicator to exhibit each class of fares, indicator-wheels to exhibit the number of passengers, differential plates to concurrently actuate each series of registering-wheels and a fare-indicator, and means for simultaneously actuating said plates and the indicator-wheels.

2. In a fare-register, the combination of groups of fare-registering wheels, each group having its own classification of fares, a rotatable fare-indicator to exhibit the fares of each class, indicator-wheels to exhibit the number of passengers, differential plates to concurrently actuate each group of register-wheels and a fare-indicator, and an operating-lever to simultaneously actuate said differential plates and indicator-wheels.

3. In a fare-register, the combination of groups of fare-register wheels, each group registering a separate class of fares, a rotatable fare-indicator for each class of fares, differential plates pivotally connected and operating concurrently to actuate a group of registering-wheels and their indicator, and a single member for imparting variable movements to said plates.

4. In a fare-register, the combination of groups of fare-registering wheels, each group adapted to register a distinct class of fares, a rotatable fare-indicator to exhibit the fares of each specific class of registering-wheels, differential plates movable concurrently and adapted to actuate a group of registering-wheels and a fare-indicator, an oscillating shaft with means thereon for locking each fare-indicator in its exposed position, and means for simultaneously imparting variable movements to said differential plates.

5. In a fare-register, the combination of groups of fare-registering wheels, each group having a specific class of fares, a fare-indicator for each group of wheels, the said fare-indicator being adapted to rotate in a horizontal plane to expose two sides one of which shows a fare and the other being blank, variably-movable plates to concurrently actuate a group of wheels and a fare-indicator, and means for simultaneously actuating said plates.

6. In a fare-register, the combination of fare-registering wheels assembled in groups, a fare-indicator to exhibit the fares of each group, the said fare-indicator having two sides adapted to be alternately exposed; one side exhibiting a fare and the other side a blank space, an oscillating shaft with means thereon for simultaneously locking one fare-indicator in a position to expose a fare, and releasing another to expose its blank space, two plates pivotally connected and subject to concurrent and variable movements to actuate a group of wheels and a fare-indicator, and means for imparting said movements.

7. In a fare-register, the combination with fare-registering wheels, of a platen having two perpendicular sides with semicircular openings therein, cams movable in said openings to elevate said platen, and means for locking the cam-shaft against movement, substantially as specified.

In testimony that I claim the foregoing as my own I hereto affix my signature in presence of two witnesses.

WALLACE M. KELCH.

Witnesses:
W. B. NEVIN,
R. J. McCARTY.